United States Patent [19]

Scheidler

[11] 4,057,670

[45] Nov. 8, 1977

[54] COOKING SURFACES OF GLASS-CERAMIC PLATES WITH LAYERS WITH DIFFERENT VALUES FOR RADIATION TRANSMISSION

[75] Inventor: Herwig Scheidler, Finthen, Germany

[73] Assignee: JENAer Glaswerk Schott & Gen., Mainz, Germany

[21] Appl. No.: 653,085

[22] Filed: Jan. 28, 1976

[51] Int. Cl.[2] .............................................. B32B 17/06

[52] U.S. Cl. ...................................... 428/189; 99/422; 99/DIG. 5; 219/464; 428/210; 428/212; 428/213; 428/215; 428/332; 428/334; 428/428; 428/432; 428/446; 428/539

[58] Field of Search ............... 428/189, 210, 212, 213, 428/426, 428, 432, 539, 215, 332, 334, 446; 219/464; 99/422, DIG. 5

[56] References Cited

U.S. PATENT DOCUMENTS

| | | | |
|---|---|---|---|
| 3,406,279 | 10/1968 | Ziver | 219/464 |
| 3,838,505 | 10/1974 | Doner | 219/464 |
| 3,889,021 | 6/1975 | Kuwayama | 219/464 |

*Primary Examiner*—Marion E. McCamish
*Attorney, Agent, or Firm*—Littlepage, Quaintance, Murphy, Richardson & Webner

[57] ABSTRACT

A glass-ceramic plate cooking surface comprises a glass-ceramic base layer which allows penetration of thermal radiation having a wave length of from 0.7 to 5 microns and a top covering layer smaller in thickness than the base layer which is tightly joined to the base layer and absorbs the radiation with wave lengths of 0.7 to 5 microns. The glass-ceramic plate cooking surface can have the heating areas indicated by design and can be provided with an additional layer to avoid asymmetric stress and strengthen the cooking surface.

16 Claims, 7 Drawing Figures

Transmittance Characteristics of Three Glass-Ceramic Materials

FIG. 3 Boiling Curves for Two Liters of Water Heated Through Various Materials
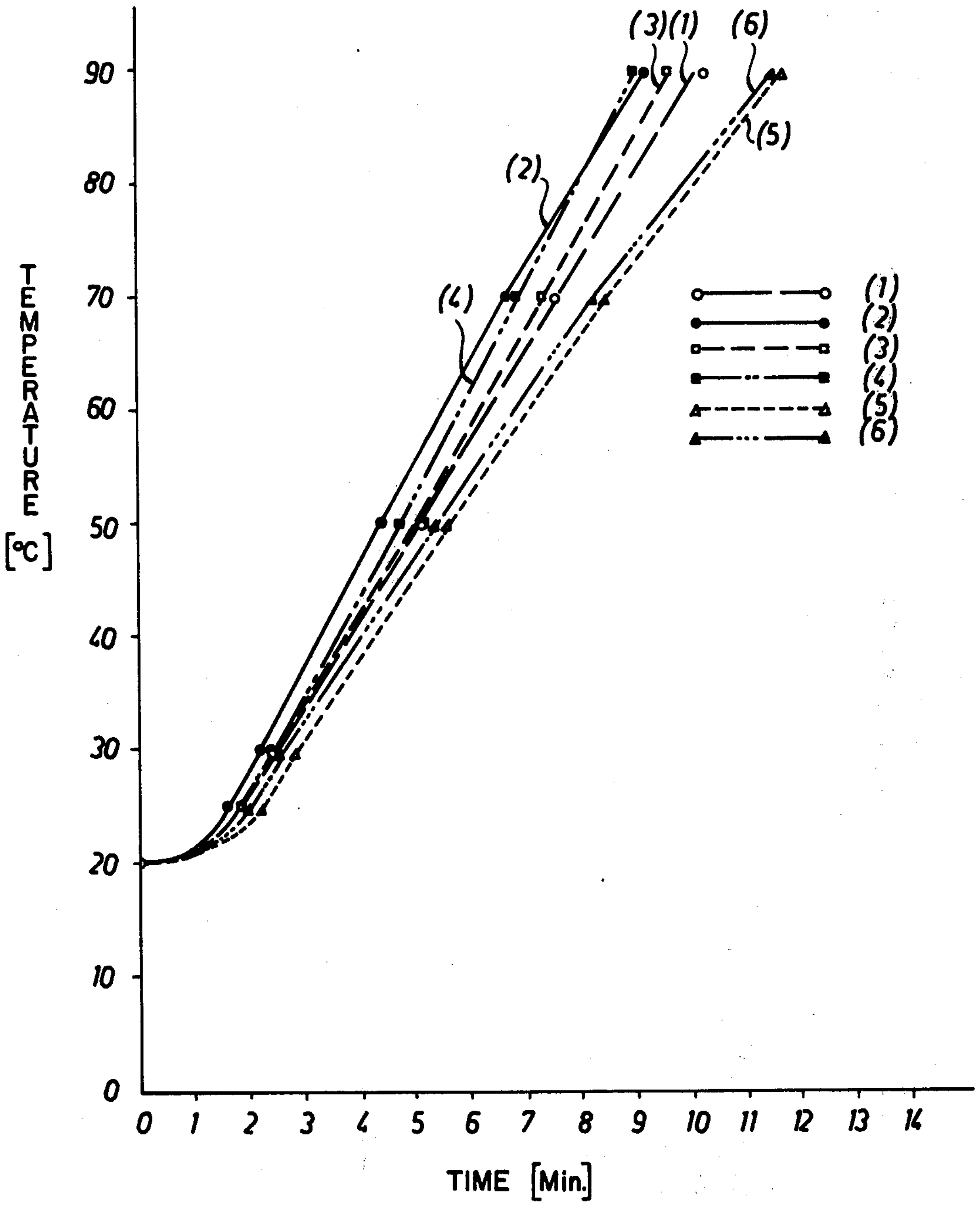

Boiling Curves for Two Liters of Water on Glass-Ceramic With and Without Screening Layer FIG. 6A
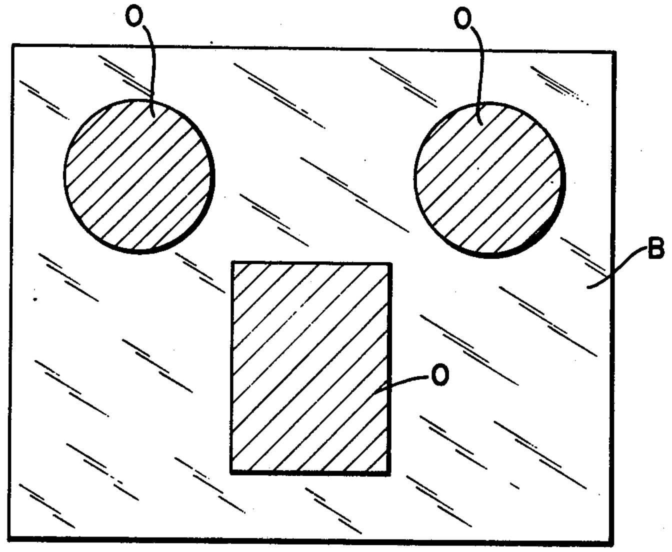
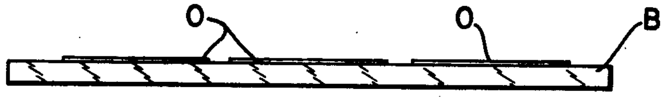
FIG. 6B
FIG. 7
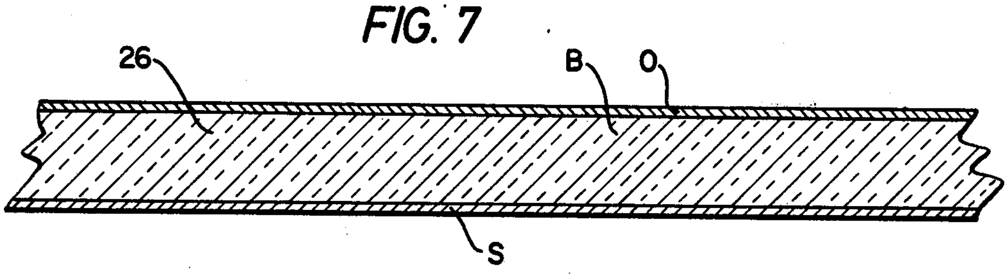

COOKING SURFACES OF GLASS-CERAMIC PLATES WITH LAYERS WITH DIFFERENT VALUES FOR RADIATION TRANSMISSION

BACKGROUND OF THE INVENTION

1. Field of the Invention

The present invention relates to cooking surfaces of glass-ceramic used on domestic kitchen ranges which have a heat source on the underside of the cooking surface, the heat energy being transmitted through the cooking surface to the upper side. The present invention relates specifically to a glass-ceramic plate having two layers, one of which transmits and another of which absorbs thermal radiations in the near infrared range.

2. Description of the Prior Art

For several years, glass-ceramics have been known which can be used in the manufacture of cooking surfaces. These various glass-ceramic cooking surfaces differ from each other in their radiation transmittance for visible rays as well as for radiation having wave lengths in the infrared area. The various glass-ceramic surfaces find application in combination with heating elements which function according to two different principles.

In one application, the heating element contacts the underside of the glass-ceramic and functions according to the principles of conductance between the heating and cooking surfaces. In other application, the heating element is spaced from the underside of the glass-ceramic surface and functions according to the principles of radiation. In both applications the heating element must have a temperature limitation imposed in order to minimize over-heating of the glass-ceramic which might result in a structural failure. This imposition of the temperature limitation establishes a theoretical maximum heat delivering capability for each given application.

It has long been thought that to achieve the best possible performance consistent with economy of operation, the makeup of the glass-ceramic plate should be selected so as to optimize the heat delivering capability. Especially in the application employing a heating element spaced from the underside of the glass-ceramic plate, the radiation transmittance value of the glass-ceramic plate in the infrared wave length area was thought to be determinative of the boiling time and efficiency.

Surprisingly, it has been discovered that the best cooking performance does not come from the use of a glass-ceramic plate with the highest radiation transmittance value. This surprising result is believed to be caused by partial reflection of thermal radiation by the cooking vessel back through the glass-ceramic plate to the area of the heating element. This, in turn, increases the temperature in the region of the heating element triggering the temperature limitation, thus reducing the amount of thermal radiation which the heating unit is permitted to emit.

An additional disadvantage of glass-ceramic plates with higher values for radiation transmittance lies in the fact that when used with transparent or translucent glass or glass-ceramic cookware, the food can easily burn since the radiation partially goes through the cooking surface and cookware bottom unhindered directly to the food. This occurs especially with high output radiation heating units which are used to make a fast boiling time possible in these ranges.

The typical glass-ceramics with high radiation transmittance values in the infrared range also have good transparency in the area of visible wave lengths. For this reason, these glass-ceramics are disadvantageous in combination with radiation heating sources since the brightly glowing heating elements shine through the plate to an undesirable extent.

SUMMARY OF THE INVENTION

A goal of the present invention is to obtain the advantages of a high radiation transmittance value of a glass-ceramic plate for use in cooking surfaces and, at the same time, diminish the disadvantages accompanying these kinds of glass-ceramic plates. The glass-ceramic plate, according to the invention, consists of at least two layers. Preferably, it has a relatively thicker base layer which has the highest possible radiation transmittance value and on top of this layer on the cooking surface side is a thin second layer, or top-covering layer, which is preferably approximately one-tenth the thickness of the base layer. The radiation transmission value of this top covering layer is negligibly small or is such that radiation coming from the heating unit to the cooking side upper surface is substantially absorbed. Through this combination of two layers with different radiation transmittance values, the best possible balance is reached for the heat transmission between the heat source and the food.

In a preferred embodiment, the thicker base layer is between 3.0 and 5.5 mm while the top covering layer is between 0.3 and 0.55 mm. The thin upper surface layer can be achieved in different ways including, pressure bonding a radiation non-transmittive enamel layer or through infusion of certain oxides, for example, cobalt oxide or manganese oxide, onto the upper surface of the base layer of the glass-ceramic.

In a particular embodiment of the present invention, the upper surface layer is confined to the area of the cooking zone which incidentally shows an optical designed pattern of these cooking zones.

In another embodiment, a glass-ceramic cooking surface is constructed having three layers, the two outer layers differing in their properties from the base layer in a way that the outer layers generate compressive stresses in the surface thereby increasing the mechanical strength of the cooking surface. In this embodiment, the layer facing the heating source has an at least equally good radiation transmittive value as the middle thick base layer and only the top cooking side upper layer is essentially radiation non-transmittive.

It is therefore an object of the present invention to produce a glass-ceramic plate which utilizes both radiation and conductance. Furthermore, it is an object of the invention to produce a cooking surface that eliminates the site of the brightly glowing heating elements. Yet another object of the invention is to increase the strength of the cooking surface. Additional objects and advantages will become apparent to the one of ordinary skill in the art from the following disclosure and by referring to the accompanying drawings.

BRIEF DESCRIPTION OF THE DRAWINGS

FIG. 3 is a graph of the temperature in degrees centigrade as a function of time in minutes for two liters of water placed on different selected plates positioned on the cooking unit shown in FIG. 2.

FIG. 6*a* shows a plan view of a cooking surface top with designated cooking areas to indicate the area above a heat source.

FIG. 6*b* is a cross-sectional view of the cooking surface top of FIG. 6*a*.

FIG. 7 is a cross section of a three layer glass-ceramic plate according to this invention having a top layer that is radiation non-transmittive, a middle layer that is highly transmittive, and a third layer intended to face a heating source which also has a high radiation transmittive value but has the same stress factor as the top layer.

DESCRIPTION OF THE PREFERRED EMBODIMENTS

Figure 1:
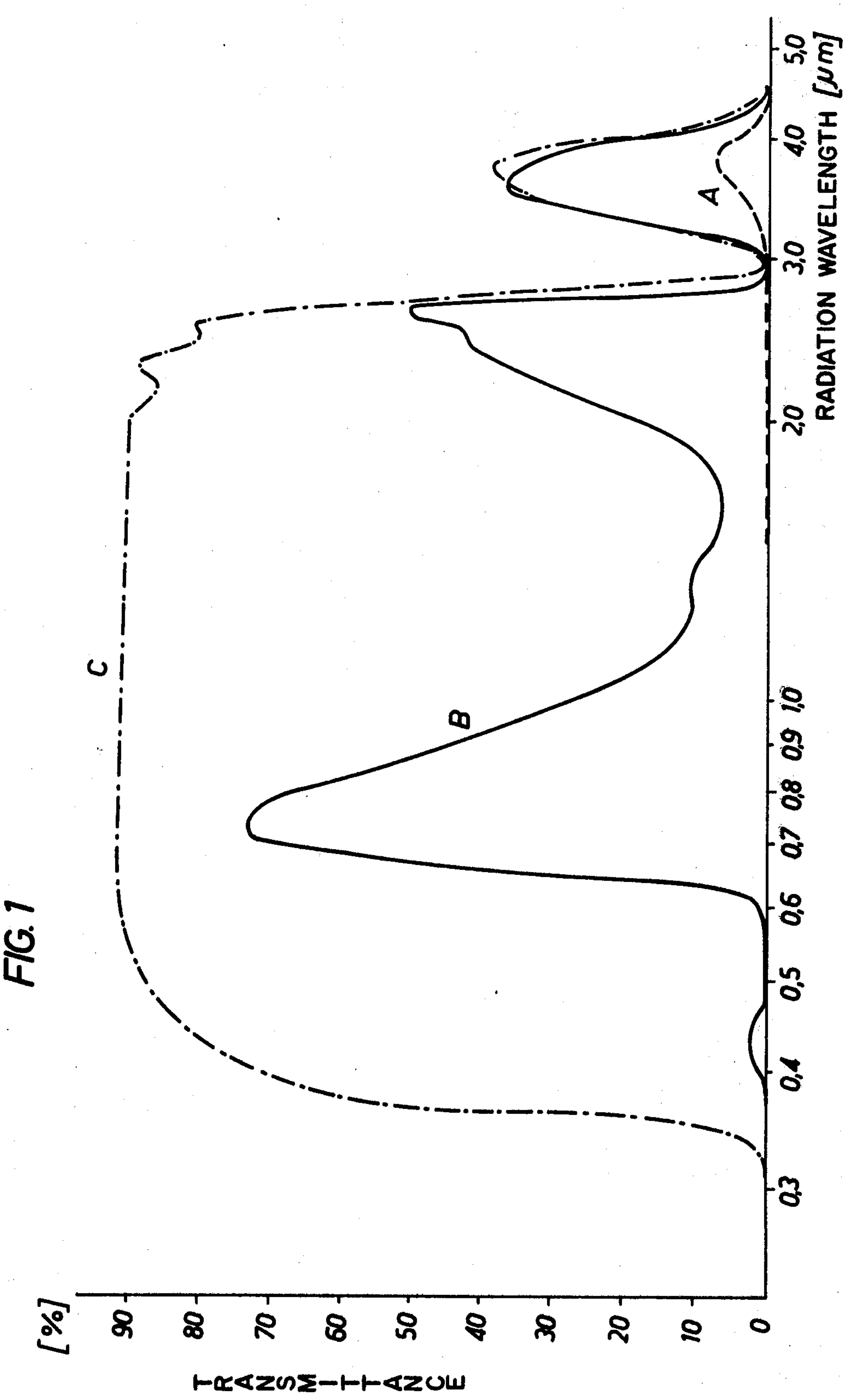
FIG. 1 is a graph of the transmittance values for three glass-ceramic materials having different transmittance characteristics as a function of the wave length of the transmitted energy.
Figure 4:
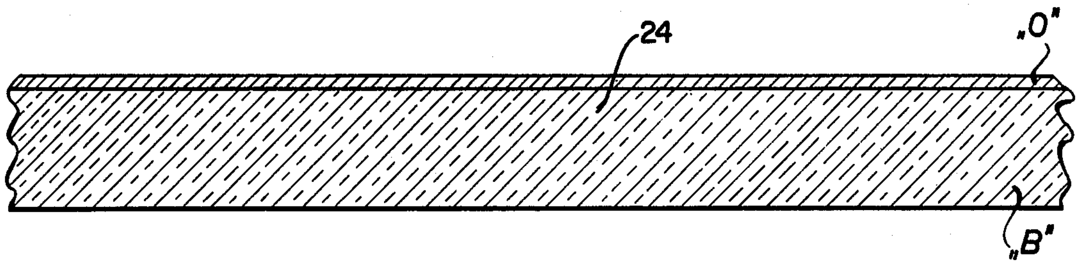
FIG. 4 is a cross-section of a glass-ceramic plate according to this invention having a radiation transmittive layer "B" and a radiation non-transmittive layer "O."
Figure 2:
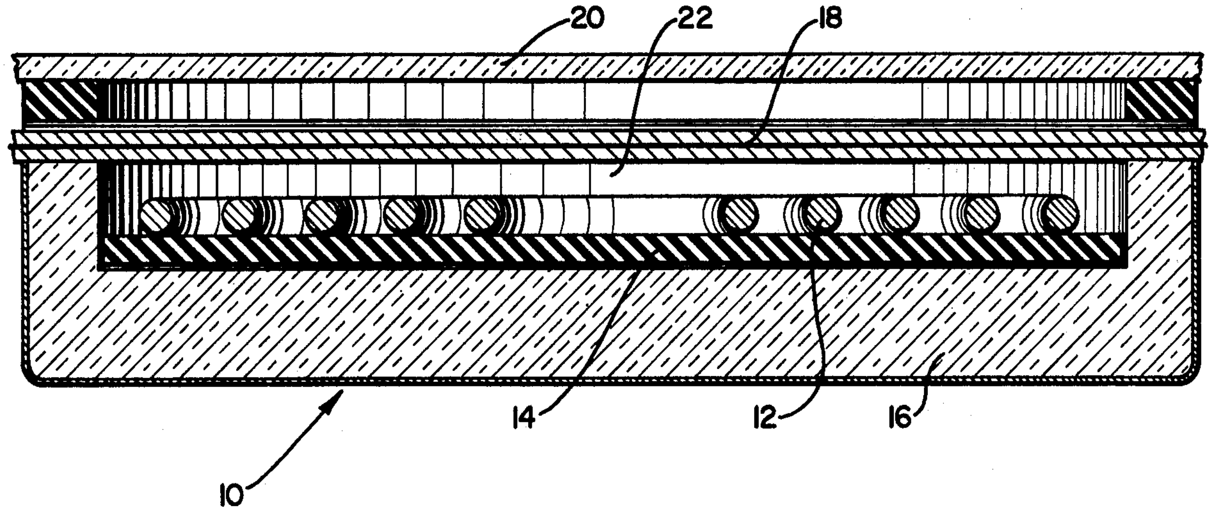
FIG. 2 is a sectional detail of the glass-ceramic cooking surface employed to obtain the results in Tables 1 and 2 and FIG. 3.

A series of tests have been conducted in order to determine the most desirable characteristics of glass-ceramic plates to achieve the best cooking performance in ranges and similar domestic appliances. It was found that the best cooking performance does not come from the use of a glass-ceramic plate with the highest radiation transmittance value. This surprising result is evident if one considers the boiling tests done under the same conditions with three materials whose radiation transmittance characteristics are shown in FIG. 1. Curve A is a glass-ceramic with poor radiation transmittance characteristics. Curve B is a glass-ceramic with fair radiation transmittance characteristics. Curve C is a glass-ceramic with good radiation transmittance characteristics. The transmittance is shown in FIG. 1 as a percentage of transmission of energy through the materials as a function of wave length. FIG. 2 illustrates the cooking unit 10 employed in conducting the boiling tests. The cooking unit comprises a heating element 12 which is supported on a heating element support 14 and enclosed in an insulative jacket 16. Completing the enclosure of the heating element 12 is glass-ceramic plate 20 (same as 24 in FIG. 4 and as 26 in FIG. 2) which in the progress of the tests was replaced by the three different glass-ceramic plates having the transmittance characteristics shown in FIG. 1. Reference number 18 designates a temperature limiter.

In a pot which was variously made of either a transparent glass-ceramic material ("JENA 2000") or of stainless steel with flat bottom 2 liters of water was positioned directly above the glass-ceramic plate 20. The 2 liters of water was repeatedly heated from 20° to 90° C and the time to achieve certain temperatures was recorded and are shown together in Table 1.

TABLE 1

| Cook Top Employed | Temperature Rise from to [° C] | Boiling time for 2 liters of water in Minutes (Radiation Heating Element 1800 W; φ 192 mm) (A) | (B) | (C) |
|---|---|---|---|---|
| radiation trans-missive glass ceramic cook top φ 200 mm | 20 – 25 | 2.5 | 2.0 | 1.9 |
| | 20 – 30 | 3.4 | 3.0 | 2.7 |
| | 20 – 50 | 6.4 | 5.5 | 5.1 |
| | 20 – 70 | 9.5 | 7.9 | 7.2 |
| | 20 – 90 | 13.1 | 10.2 | 9.7 |
| stainless steel cook top φ 185 mm | 20 – 25 | 2.2 | 1.8 | 1.8 |
| | 20 – 30 | 2.9 | 2.5 | 2.5 |
| | 20 – 50 | 5.6 | 5.2 | 5.2 |
| | 20 – 70 | 8.5 | 7.4 | 7.6 |
| | 20 – 90 | 11.7 | 9.7 | 10.3 |

The differences for the individual boiling times, while real, show more aptly the relative differences and serve as a basis for the subsequent evaluation. From Table 1, it can be seen that, as expected, the longest boiling times resulted in using a glass-ceramic material having the transmittance characteristic shown as Curve A in FIG. 1. Such a glass-ceramic can be considered as non-transmittive. It can also be noted that when using a glass-ceramic cooking top, a fully transmittive cooking plate has a shorter boiling time than a partially transmittive glass-ceramic plate having the characteristics shown in Curve B of FIG. 1.

It was surprisingly found that in using the stainless steel top, a fully transmitting plate having the characteristics of Curve C performed worse than a partially transmitting plate having the characteristics of Curve B. It has been suggested that the reflective bottom surface of the stainless steel top may reflect a portion of the incident energy back through the glass-ceramic plate to the heating area 22 and that this in turn increases the temperature there more than if no reflection had occurred. This temperature increase forces the temperature limitation to come into play thereby decreasing the overall radiation emitted by the heating unit 12. This effect is more noticeable with increased heat output or increased radiation temperature. Thus an increased heat output or radiation temperature during boiling is advantageous only until the temperature limitation is achieved thus achieving the maximum heat delivery capability. This is seen from the slope of the boiling curves shown in FIG. 3.

In FIG. 3, the boiling curves, i.e., the temperature of 2 liters of water in degrees centigrade as a function of time in minutes, is shown for the following six situations:

Curve (1): 1800 W-Heating element, radiation penetrable glass-ceramic tile (C)

Curve (2): 2000 W-Heating element, radiation penetrable glass-ceramic tile (C)

Curve (3): 1800 W-Heating element, partially radiation penetrable glass-ceramic tile (B)

Curve (4): 2000 W-Heating element, partially radiation penetrable glass-ceramic tile (B)

Curve (5): 1800 W-Heating element, unpenetrable to radiation glass-ceramic tile (A)

Curve (6): 2000 W-Heating element, unpenetrable to radiation glass-ceramic tile (A)

The decreasing slope in Curves (1) and (2) shows that only in the first phase of boiling in the higher heat output operative. The decreasing slope is interpreted to indicate the functioning of the temperature limitation. On the other hand, Curves (3) and (4) show no decreasing slope, thus effectively shortening the boiling time even if only by a small amount. This shortening of boiling time is believed to be achieved by means of the higher heat energy output as the temperature limitation has not come into effect.

As expected, the boiling times using a non-radiation transmittive surface (a) in both instances 5 and 6 are much longer and therefore undesirable than using either of the other two types of surfaces. The curves illustrated in FIG. 3 are based on the values shown in Table 2 in the test situation in which the pot was made of stainless steel.

TABLE 2

| Heat Source Employed | Temperature Rise from to [° C] | Boiling time for 2 liters of Water in Minutes (Stainless Steel Cook Top; φ 185 mm) Glass Ceramic (A) | (B) | (C) |
|---|---|---|---|---|
| Radiation | 20 - 25 | 2.2 | 1.8 | 2.0 |
| Heat | | | | |
| Source | 20 - 30 | 2.9 | 2.5 | 2.7 |
| 1800 W | | | | |
| φ 192 mm | 20 - 50 | 5.6 | 5.2 | 5.2 |
| | 20 - 70 | 8.5 | 7.4 | 7.6 |
| | 20 - 90 | 11.7 | 9.7 | 10.3 |
| Radiation | 20 - 25 | 1.9 | 1.8 | 1.6 |
| Heat | | | | |
| Source | 20 - 30 | 2.6 | 2.4 | 2.2 |
| 2000 W | | | | |
| φ 192 mm | 20 - 50 | 5.4 | 4.8 | 4.4 |
| | 20 - 70 | 8.3 | 6.9 | 6.7 |
| | 20 - 90 | 11.6 | 9.1 | 9.2 |

In order that the advantages of a high radiation transmittance value of a glass-ceramic plate for use in cooking surfaces could be realized and, at the same time, diminish the usual disadvantages accompanying these kinds of glass-ceramic plates, a new type of glass-ceramic plate was created consisting of at least two layers. The glass-ceramic plate according to this invention has a first relatively thicker base layer illustrated in FIG. 4 as B, which in the near infra-red range has the highest possible radiation transmittance. In practical commercial embodiments, layer B would preferably be between 3.0 and 5.5 mm thick. On top of layer B on the cooking surface side of the plate 24 is a thin second layer O. This covering layer O is preferably about one tenth the thickness of the base layer B. The radiation transmittance value of this layer is negligibly small or is such that radiation coming from a heating unit to the cooking side of plate 24 is substantially absorbed in layer O. The best possible balance for the heat transmission by radiation between the heat source and the item sought to be heated is achieved through this combination of two layers with dramatically different radiation transmittance values. The full radiation output of the heat source, after first penetrating through the high radiation transmittance layer, is largely absorbed in the second thin layer and is then transmitted to the materials sought to be heated by conduction. In certain instances, the secondary radiation of this layer B may become important since it will operate at a surface temperature of only a few hundred degrees centigrade lower than the heat source. In general, however, the heat will be transmitted from the thin upper layer B to the food or other materials sought to be heated by conduction.

It is therefore apparent that the upper surface layer B serves as a screening layer between the radiation from the heat source and the heat absorbed by the surface top. Up to this layer, the heat is transmitted principally by radiation while in this layer and to the surface top it proceeds by conductance. Because this layer is made only one tenth as thick as the base layer, its heat resistance is negligibly small.

Figure 5:
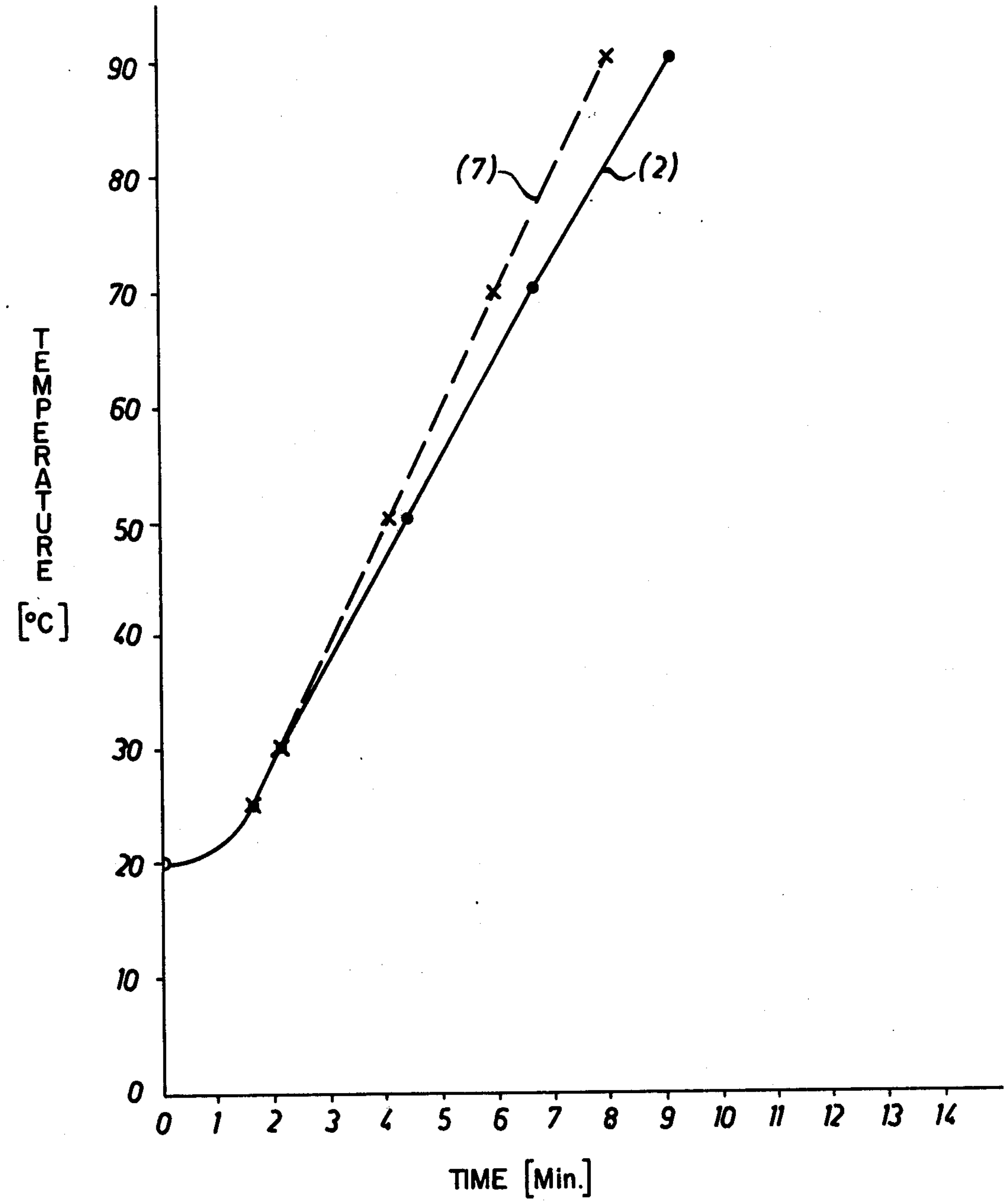
FIG. 5 is a graph of temperature in degrees centigrade as a function of time in minutes for 2 liters of water heated on the same heating unit illustrating the advantage of the addition of the radiation non-transmittive layer according to this invention.

The effectiveness of such a layer B is displayed prominantly by the measurements indicated in Table 3 and illustrated in FIG. 5. In FIG. 5, the Curve 2 is a boiling curve obtained using a glass-ceramic with a high radiation transmittance value. Curve 7 is a boiling curve obtained using a glass-ceramic having two layers, the first layer having a radiation transmittance value the same as the glass-ceramic used in Curve 2 and a thin upper level which includes radiation absorbing carbon black. The slope of the boiling curve dramatically shows the clear positive influence of this thin upper layer. It has been found that this influence is even greater when heating elements are used with greater radiation temperatures.

TABLE 3

| Glass-Ceramic Employed | Temperature Rise from to [° C] | Boiling time for 2 liters Water in Minutes (Stainless steel cook top; φ 185 mm Heat 2000 W, φ 192 mm) |
|---|---|---|
| | 20 - 25 | 1.6 |
| radiation | | |
| trans- | 20 - 30 | 2.2 |
| missive | | |
| (C) | 20 - 50 | 4.4 |
| | 20 - 70 | 6.7 |
| | 20 - 90 | 9.2 |
| | 20 - 25 | 1.6 |
| radiation | | |
| trans- | 20 - 30 | 2.2 |
| missive | | |

TABLE 3-continued

| Glass-Ceramic Employed | Temperature Rise from to [° C] | Boiling time for 2 liters Water in Minutes (Stainless steel cook top; φ 185 mm Heat 2000 W, φ 192 mm) |
|---|---|---|
| (C) | 20 - 50 | 4.1 |
| upper side blacked | 20 - 70 | 6.0 |
| with carbon | 20 - 90 | 8.1 |

A glass-ceramic cooking plate according to this invention is typically horizontally disposed with a heating element or elements on the underside of the plate, the heat energy from the heating element being transmitted through the plate to the upper surface of the plate where the pot is located. The base layer of the glass ceramic cooking plate according to this invention can be made of any of a number of electrically insulating, highly wear and thermal shock resistant materials. The glass-ceramic materials in general have a low coefficient of thermal expansion and should have a high transmittance value for radient energy whose wave length is from 0.7 to 5 microns. Any glass-ceramic material having a transmittance value of greater than 80% for energy whose wave length is between 0.7 and 2 microns should be considered a high transmittance value glass-ceramic.

The covering layer of the glass-ceramic cooking plate according to this invention should be smaller in thickness than the base layer and tenaciously adhered to the top of the base layer. The covering layer should have a low transmittance value for radiation having a wave length between 0.7 and 5 microns. A preferred covering layer would have a transmittance of no more than 20% over the entire range of 0.7 to 5 microns while the preferred material would have a transmittance no greater than 10% over the same range of wave lengths.

The thin covering layer can be achieved in different ways. The covering layer can be made by known ion exchange processes similar to those used in coloring glass with known diffusion colors for use in the ultraviolet and invisible wave lengths areas to infuse certain oxides, for example, cobalt oxide and manganese oxide, into a thin upper portion of the base layer of the glass-ceramic. The thin upper layer may also be obtained by applying an enamel layer which is fused on the surface of the base layer of glass-ceramic after the crystallization of the base layer.

A particularly pleasing embodiment of the present invention is illustrated in FIGS. *6a* and *6b* wherein the thin covering layer O is only selectively applied to preselected portions of the top surface of the base layer B in order to indicate preferential cooking or heating zones with an observable design or pattern.

Another feature of this invention illustrated in FIG. 7 is a three layer glass-ceramic cooking surface 26 having a base layer B, a covering layer O and a third layer S which is tenaciously adhered to the bottom surface of the base layer. While the characteristics of the base layer B and the covering layer O remain unchanged from that previously discussed, the third layer should be approximately of the same dimension as the covering layer O but have the radiation transmittance values similar to the base layer B. The third layer serves to strengthen the glass-ceramic plate of the invention by providing compressive stress. The compressive strength characteristic matching can be done by known technique of ion exchange processing of the base layer after crystallization, enameling of the base layer followed by fusing of the enamel after the crystallization of the base layer.

Although the invention has been described in considerable detail with reference to certain preferred embodiments thereof, it will be understood that variations and modifications can be effected within the spirit and scope of the invention as described above and as defined in the appended claims.

What is claimed is:

1. A glass-ceramic cooking plate for use with heating elements on the underside of the plate, the heat energy from the heating elements being transmitted through the plate to the upper surface of the plate, said plate comprising a glass-ceramic base layer having a high transmittance value for radiation whose wave length is from 0.7 to 5 microns and a covering layer smaller in thickness than the base layer, tenaciously adhered to the top of the base layer, said covering layer absorbing substantially all radiation with wave lengths of 0.7 to 5 microns transmitted the base layer.

2. The glass-ceramic cooking plate according to claim 1 wherein the thickness of the covering layer is at most one-tenth of the thickness of the base layer.

3. The glass-ceramic cooking plate according to claim 1 wherein the thickness of the base layer is from 3 to 5.5 mm.

4. The glass-ceramic cooking plate according to claim 1 wherein the covering layer consists of an enamel layer.

5. The glass-ceramic cooking plate according to claim 1 wherein the covering layer is constructed of a metal oxide fused into the upper surface of the base layer.

6. The cooking surface according to claim 5 wherein the metal oxide is selected from the group consisting of cobalt oxide and manganese oxide.

7. The glass-ceramic cooking plate according to claim 1 wherein the covering layer is placed only on preselected portions of the top of the base layer to advantageously indicate preferential heating zones.

8. The glass-ceramic cooking plate according to claim 1 wherein a third layer is tenaciously adhered to the underside of the base layer, the third layer being equal in size and stress condition to the covering layer and having transmittance characteristics substantially the same as the base layer.

9. The glass-ceramic cooking plate according to claim 1 wherein the third layer and the covering layer are both applied universally to the base layer under sufficient pressure to impact a permanent compressive stress to the glass-ceramic plate.

10. The glass-ceramic cooking plate according to claim 9 wherein the compressive stress is achieved by an ion exchange process after crystallization of the base layer.

11. The glass-ceramic cooking plate according to claim 9 wherein the compressive stress is attained through the application of enamel layers which have been fused onto the base layer after the crystallization of the base layer.

12. The glass-ceramic cooking plate according to claim 9 wherein the compressive stress through the three layer glass-ceramic surface is attained by treating the base layer to effect a change in the physical makeup of an additive combined with the base layer during formation thereof in the region of the surfaces of the base layer.

13. A glass-ceramic cooking plate horizontally disposed for use with heating elements on the underside of the plate, the heat energy from the heating elements being transmitted through the plate to the upper surface of the plate, said plate comprising a glass-ceramic base layer having a transmittance value of greater than 80% for radiation whose wave length is from 0.7 to 2.0 microns and a covering layer of at most one-tenth the thickness of the base layer tenaciously adhered to the top of the base layer, the covering layer having a transmittance value of less than 20% for radiation whose wave length is from 0.7 to 2 microns.

14. The glass-ceramic cooking plate according to claim 13 wherein the base layer has a thickness of from 3.0 to 5.5 mm and a transmittance value of greater than 90% for radiation having a wave length between 0.7 and 2.0 microns.

15. The glass-ceramic plate according to claim 13 wherein the covering layer has a transmittance value of less than 10% for radiation having a wave length of between 0.7 and 2 microns and is constructed of an oxide selected from the group consisting of cobalt oxide and manganese oxide fused into the upper surface of the base layer.

16. The glass-ceramic cooking plate according to claim 15 further comprising a third layer tenaciously adhered to the underside of the base layer having stress characteristics substantially the same as the covering layer while having transmittance characteristics substantially the same as the base layer.

* * * * *